United States Patent
Gasparini et al.

(10) Patent No.: US 7,562,222 B2
(45) Date of Patent: *Jul. 14, 2009

(54) SYSTEM AND METHOD FOR AUTHENTICATING ENTITIES TO USERS

(75) Inventors: Louis A Gasparini, San Mateo, CA (US); William H Harris, Woodside, CA (US)

(73) Assignee: RSA Security Inc., Bedford, MA (US)

( * ) Notice: Subject to any disclaimer, the term of this patent is extended or adjusted under 35 U.S.C. 154(b) by 376 days.

This patent is subject to a terminal disclaimer.

(21) Appl. No.: 11/088,349

(22) Filed: Mar. 23, 2005

(65) Prior Publication Data

US 2005/0268100 A1 Dec. 1, 2005

Related U.S. Application Data

(63) Continuation-in-part of application No. 10/435,322, filed on May 9, 2003, now Pat. No. 7,100,049, said application No. 11/088,349 is a continuation-in-part of application No. 11/050,549, filed on Feb. 3, 2005.

(60) Provisional application No. 60/555,790, filed on Mar. 23, 2004, provisional application No. 60/379,295, filed on May 10, 2002, provisional application No. 60/542,101, filed on Feb. 4, 2004.

(51) Int. Cl.
*H04L 9/00* (2006.01)

(52) U.S. Cl. ............... 713/170; 713/168; 713/185; 713/155; 726/1; 726/2; 726/3; 726/5

(58) Field of Classification Search ............... 713/170, 713/156, 176, 185, 168, 155; 726/2, 3, 1, 726/5, 10

See application file for complete search history.

(56) References Cited

U.S. PATENT DOCUMENTS

| | | | | |
|---|---|---|---|---|
| 5,815,665 | A * | 9/1998 | Teper et al. | 709/229 |
| 6,018,801 | A * | 1/2000 | Palage et al. | 726/2 |
| 6,049,877 | A * | 4/2000 | White | 726/5 |
| 6,161,139 | A | 12/2000 | Win et al. | |
| 6,199,113 | B1 * | 3/2001 | Alegre et al. | 709/229 |
| 6,275,934 | B1 * | 8/2001 | Novicov et al. | 713/168 |
| 6,311,269 | B2 * | 10/2001 | Luckenbaugh et al. | 713/154 |

(Continued)

FOREIGN PATENT DOCUMENTS

EP 1046976 10/2000

(Continued)

OTHER PUBLICATIONS

Meg O'Sullivan et al, Security Dynamics to Showcase WebID at Internet World, pp. 1-3, Business Wire, Mar. 1997.*

(Continued)

*Primary Examiner*—Nasser G Moazzami
*Assistant Examiner*—Shanto M Abedin
(74) *Attorney, Agent, or Firm*—Ryan, Mason & Lewis, LLP

(57) ABSTRACT

A system and method communicates information from an entity that a registry can use to authenticate the entity to a user. If the registry authenticates the entity, it displays information that represents a shared secret between the registry and the user.

20 Claims, 5 Drawing Sheets

U.S. PATENT DOCUMENTS

| | | | |
|---|---|---|---|
| 6,401,125 | B1 | 6/2002 | Makarios et al. |
| 6,632,248 | B1 | 10/2003 | Isaac et al. |
| 6,718,328 | B1* | 4/2004 | Norris ............................ 707/9 |
| 6,874,084 | B1* | 3/2005 | Dobner et al. ............... 713/156 |
| 6,968,571 | B2 | 11/2005 | Devine et al. |
| 6,986,038 | B1* | 1/2006 | Leah et al. ................... 713/155 |
| 7,082,532 | B1* | 7/2006 | Vick et al. ................... 713/155 |
| 7,100,049 | B2* | 8/2006 | Gasparini et al. ........... 713/170 |
| 7,100,195 | B1* | 8/2006 | Underwood .................... 726/2 |
| 7,143,443 | B2* | 11/2006 | Song et al. .................... 726/29 |
| 7,231,659 | B2* | 6/2007 | Trilli et al. ..................... 726/3 |
| 7,346,775 | B2* | 3/2008 | Gasparinl et al. ........... 713/170 |
| 7,356,560 | B2* | 4/2008 | Calinov et al. .............. 709/203 |
| 7,426,642 | B2* | 9/2008 | Aupperle et al. ............ 713/185 |
| 2001/0045451 | A1* | 11/2001 | Tan et al. .................... 235/375 |
| 2002/0066039 | A1 | 5/2002 | Dent |
| 2002/0078212 | A1* | 6/2002 | Besaw et al. ................ 709/228 |
| 2002/0124172 | A1* | 9/2002 | Manahan .................... 713/176 |
| 2002/0178370 | A1* | 11/2002 | Gurevich et al. ............ 713/189 |
| 2003/0028762 | A1* | 2/2003 | Trilli et al. .................. 713/153 |
| 2003/0041240 | A1* | 2/2003 | Roskind et al. ............. 713/168 |
| 2003/0163694 | A1* | 8/2003 | Chen et al. .................. 713/170 |
| 2003/0177388 | A1* | 9/2003 | Botz et al. ................... 713/201 |
| 2004/0054898 | A1* | 3/2004 | Chao et al. .................. 713/168 |
| 2004/0078564 | A1* | 4/2004 | Abdulhayoglu ............. 713/156 |
| 2004/0098595 | A1* | 5/2004 | Aupperle et al. ............ 713/185 |
| 2004/0107282 | A1* | 6/2004 | Chakraborty et al. ....... 709/229 |
| 2005/0074126 | A1* | 4/2005 | Stanko ........................ 380/279 |
| 2005/0138362 | A1* | 6/2005 | Kelly et al. .................. 713/156 |
| 2005/0268101 | A1* | 12/2005 | Gasparini et al. ........... 713/176 |

FOREIGN PATENT DOCUMENTS

| | | |
|---|---|---|
| EP | 04760929 | 4/2007 |
| EP | 05712935 | 2/2008 |
| WO | 0118636 | 3/2001 |
| WO | 0163878 | 8/2001 |
| WO | WO03048909 | 6/2003 |

OTHER PUBLICATIONS

International Search Report, Sep. 12, 2006, 3 pages.
Written Opinion of the International Searching Authority, Sep. 12, 2006, 3 pages.
S. Loftesness, "Responding to "Phishing" Attacks-A Glenbrook Action Map," Glenbrook Partners LLC., Jan. 2004, pp. 1-12.

* cited by examiner

Illustration of Verification Seal for a Web Site

Illustration of Verification Seal for an Email

SYSTEM AND METHOD FOR AUTHENTICATING ENTITIES TO USERS

RELATED APPLICATIONS

This application claims the benefit of U.S. provisional application Ser. No. 60/555,790, entitled "Method and Apparatus for Authenticating Entities by Non-Registered Users," filed by Louis Gasparini and William Harris on Mar. 23, 2004. This application is a continuation-in-part of U.S. application Ser. No. 10/435,322, entitled "Method and Apparatus for Authentication of Users and Web Sites," filed on May 9, 2003 now U.S. Pat. No. 7,100,049 by Louis Gasparini and Charles Gotlieb, which claims the benefit of U.S. provisional application Ser. No. 60/379,295 entitled "Smart Marks," filed on May 10, 2002 by Louis Gasparini. This application is also a continuation-in-part of U.S. application Ser. No. 11/050,549, entitled "System and Method for Authentication of Users and Communications Received from Computer Systems," filed on Feb. 3, 2005 by Louis Gasparini and William Harris, which claims the benefit of U.S. provisional application Ser. No. 60/542,101, entitled "Method and Apparatus for Authentication of Users and Communications Received From Computer Systems," filed on Feb. 4, 2004 by Louis Gasparini and William Harris and is a continuation-in-part of U.S. application Ser. No. 10/435,322, entitled "Method and Apparatus for Authentication of Users and Web Sites," filed on May 9, 2003 now U.S. Pat. No. 7,100,049 by Louis Gasparini and Charles Gotlieb. Each is hereby incorporated by reference in its entirety.

BACKGROUND OF THE INVENTION

When communicating electronically, one challenge is to authenticate the parties on each side of the communication. It is common practice for the user (typically a customer, prospect, partner, employee or citizen) to authenticate himself to the entity (typically a financial institution, merchant, service provider, biller, payment network, corporation or government) by providing a shared secret, such as a password.

However, the authentication of a user to an entity only authenticates the user to the entity. In order to prevent the class of attacks in which a fraudulent party impersonates an entity, in can be desirable to provide a mechanism to authenticate the entity to the user.

The related applications describe, among other things, an arrangement whereby a user can register with an entity and authenticate communications from, and websites of, that entity. If the user repeatedly receives such communications or websites, it can be worth the overhead to perform such registration. However, the user may wish to authenticate web sites or communications from entities for which no such registration for each entity is required.

What is needed is a system and method to allow a user to authenticate web sites of, and communications from, one or more entities, without registering to each such entity.

SUMMARY OF INVENTION

A system and method allows a user to register customization information at a single registry, and the customization information is then accessible using links from various web sites and communications from various entities to allow the user to authenticate such web sites and such communications. The web site to be authenticated uses a subdomain of the registry that the web site actually supports to place the link to the registry containing additional information, such as an indication of the source of the web site or communication being authenticated. The use of the subdomain allows the web site or other source of a communication to place a cookie on the user's computer system that will also be accessible to the registry. This shared cookie provides evidence to the registry that the user is arriving or recently arriving from that web site, though other evidence, such as communications received from a secure back channel may be used in addition to, or even instead of, the shared cookie. If the evidence provided is sufficient, the registry then checks the identity of the user using a cookie placed via the registry domain or a different domain that is not shared. The registry may also ask the user to enter a username. If the web site is authentic and the user has been registered to the registry, the user can view information known to the user and the registry, but not generally known, to allow the registry to attest to the validity of the web site, and otherwise, the registry may inform the user not to trust the web site. If the user is not registered, the user may register to the registry and the registry adds the unshared cookie to the user's computer system. The system and method may be used to authenticate communications such as e-mail in addition to, or instead of, the web sites discussed above.

DETAILED DESCRIPTION OF A PREFERRED EMBODIMENT

Figure 1:
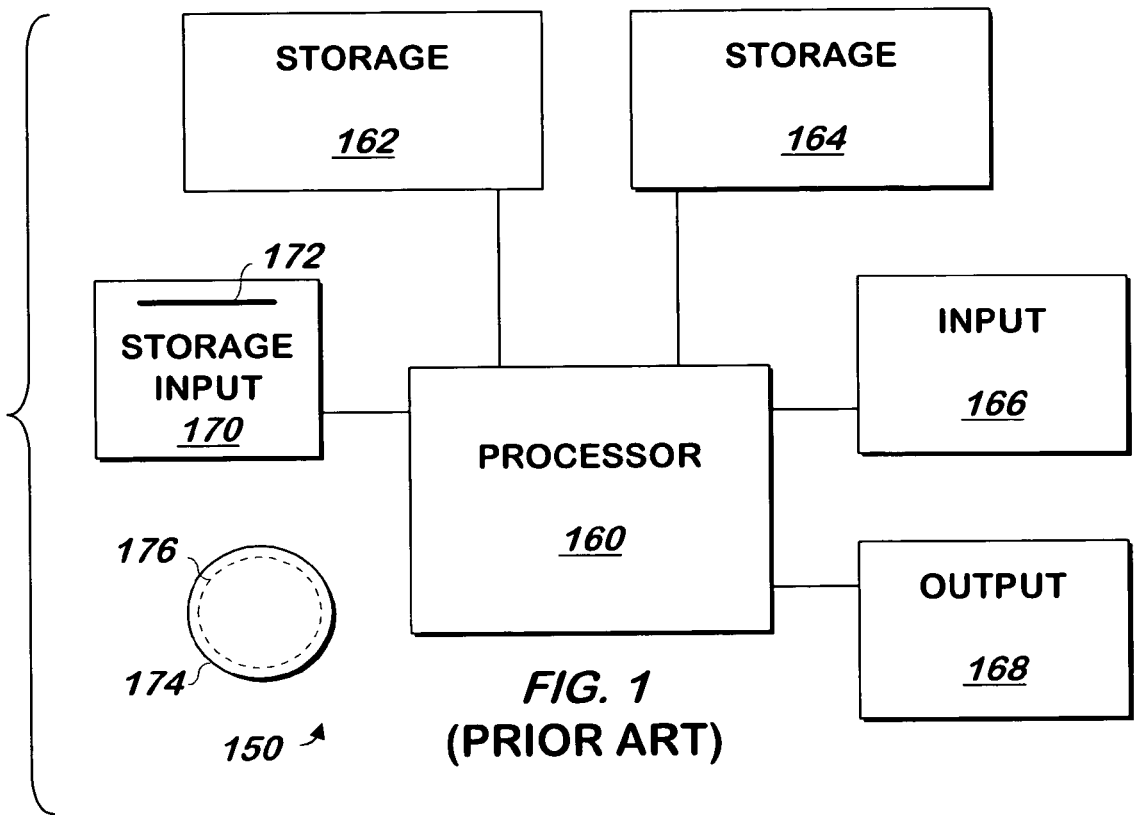
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
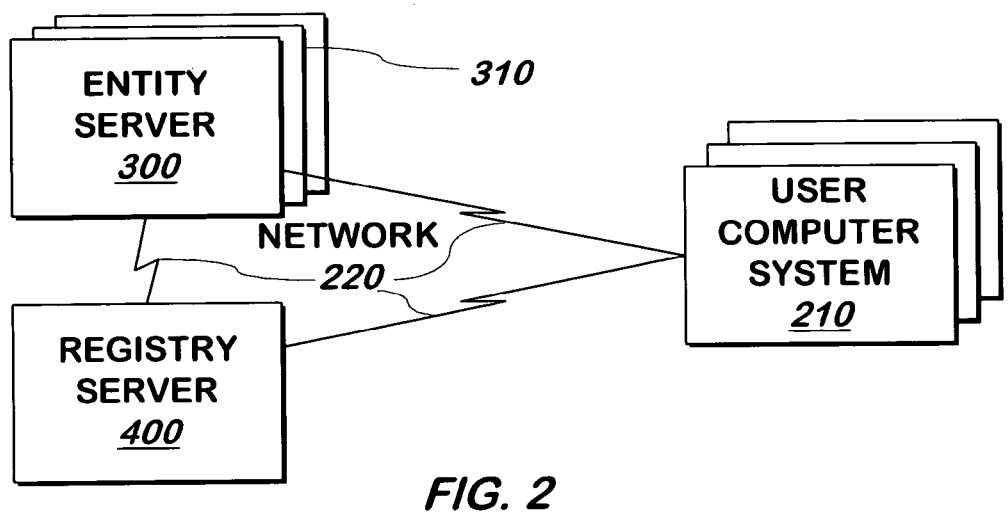
FIG. 2 is a block schematic diagram of a network of computer systems according to one embodiment of the present invention.

Referring now to FIG. 2, a representative network of computers is shown according to one embodiment of the present invention. A user computer system 210 is one of several user computers coupled to the Internet or another conventional network 220. Each user uses a different user computer system (shown behind user computer system 210), though some user computer systems may support more than one user. User computer system 210 includes any conventional computer system that runs a conventional browser and/or any conventional e-mail client software, such as OUTLOOK EXPRESS commercially available from MICROSOFT CORPORATION. There may be many user computer systems coupled to network 220 for operation in the same or similar manner to user computer system 210, which is representative of them.

There may be one or more entity servers 300 sourcing information that a user may wish to authenticate. Entity server 300 is representative of such entity servers.

A registry server 400, which may be made of several servers, operates as described herein. The registry server 400 may be shared by many entity servers 300 and many user computer systems 210. Each registry server 400 and each entity server 300 is a conventional computer system, which may be made of more than one physical computer system.

In one embodiment, the DNS entries in a conventional domain name server allow a portion or all of each entity server 300 to be a subdomain of a domain served by a registry server. Each of these servers 300, 400 or a different server operated by the same organization may also each have a DNS entry different from the DNS entry described above. For example, entity server 300 may support both amazon.com, as well as amazon.registry.com. Registry server 400 may support registry.com as well as registry1.com. Another entity server 310 operates similarly to entity server 300 and supports the domains buy.com and buy.registry.com.

Figure 3:
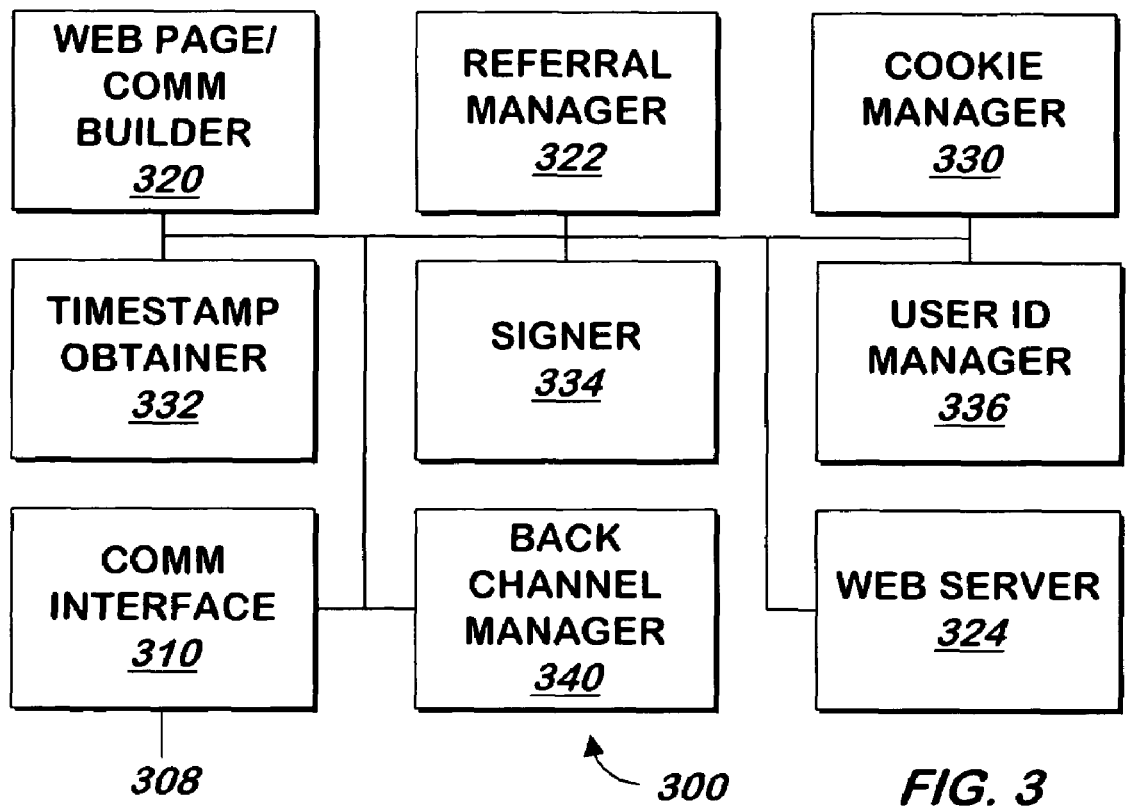
FIG. 3 is a block schematic diagram of an entity server of FIG. 2 according to one embodiment of the present invention.
Figure 4:
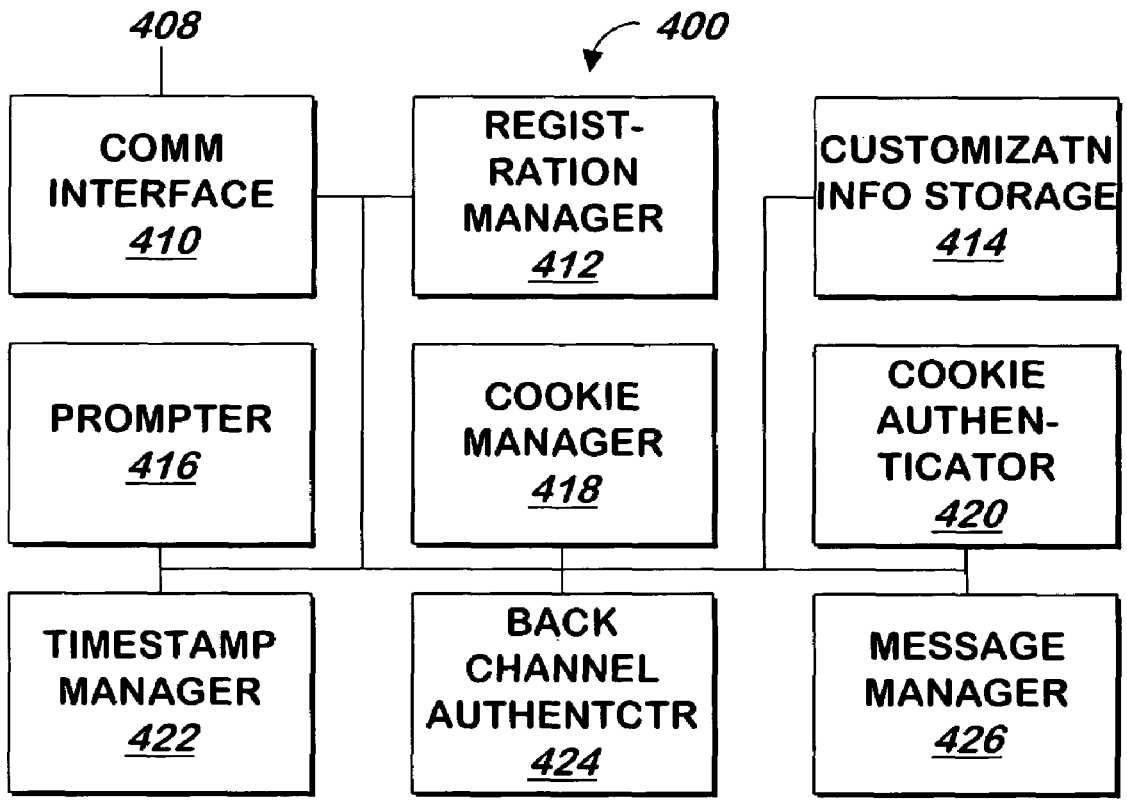
FIG. 4 is a block schematic diagram of a registry server of FIG. 2 according to one embodiment of the present invention.

In one embodiment, all communication into or out of any of the computer systems 210, 300, 400 shown in FIG. 2 is each made via an input/output of a conventional communication interface which is coupled to network 220. Each communication interface is a conventional communication interface that supports TCP/IP or other conventional communication protocols. The communication interface of entity server 300 is shown in FIG. 3 as communication interface 310 with input/output 308 and the communication interface of registry server 400 is shown in FIG. 4 as communication interface 410 with input/output 408. The use of the computer systems is described herein.

A Passmark is unique data (typically an image, but potentially any type of data including text, numerals, image, sound or video) described in the related patent applications as "customization information," which serves as a shared secret between a party (in this case, the registry) and one of its users. As used herein, a "Passmark" is any information such as an image, video, sound, text or any combination of something recognizable by a user but not generally known, and is referred to as "customization information" in the related applications and occasionally used in that form herein, but they mean the same thing. By showing the user's unique Passmark to a user, an entity can authenticate itself to that user.

The resulting two-way authentication can help secure interactions and commerce from fraud. Passmarks can be used to authenticate both "inbound" communications (such as when a user navigates to an entity's Web site or dials an entity's phone number) and "outbound" communication (such as when an entity sends an email or an instant message to a user). And Passmarks can be used to authenticate communications between an entity and both (a) its registered users and (b) non-registered users.

|  | Registered Users | Non-Registered Users |
|---|---|---|
| Inbound Communications | Class A<br>Example: Registered user navigates to entity's Web site | Class C<br>Example: Non-registered user navigates to entity's Web site |
| Outbound Communications | Class B<br>Example: Entity sends email to registered user | Class D<br>Example: Entity sends email to non-registered user |

The related applications detail the techniques and uses of Passmarks in various situations. This application describes the use of Passmarks when the user is not registered with the entity whose identity is desired to be authenticated as non-misleading: one that is who it purports to be, (Case C and Case D in the diagram above).

Use of a Registry

The use of Passmarks requires some form of registration to be effective, but the user need not perform a full authenticated registration with the entity as described in the related applications. Instead, the user can use a "registry"—a service where users can do a very quick or full-blown registration and receive a Passmark from the registry. (For more detail, see "Additional Topics: Registration Techniques", below, or the registration techniques described in any of the related applications.)

Although the user can register with a registry as described herein, three things can make this registration faster and easier than a typical registration. First, the registration process can be very lightweight, typically requiring no more information to authenticate the user than an email address. Second, a user need only register once, and some or all future communications with the entity can be authenticated. Third, if the registry performs this service for more than one entity, all future communications with all the participating entities can be authenticated as described herein.

The use of a registry allows an entity to market to users who are not registered users of the entity. If the user is registered with the registry, he or she can use the registry to verify the authenticity of the entity's Web sites and emails. And if he is not registered with the registry, it is a quick an simple process to register, which then allows him to almost-instantly verify the site of email he is viewing.

A registry can be operated by an entity for the exclusive use of the entity, by a third-party for the exclusive use of the entity, or by a third party for the use of many entities, on either a centralized or federated basis.

In one embodiment, the registry or entity being authenticated will create "verification seals" which the entity will insert into its Web sites, emails and other communications. These seals state that the registry is available to attest to the authenticity of the communication, and include instructions to the user as to how to receive such an attestation.

Class C: Inbound Communications with Non-Registered Users

When a user accesses an entity's Web site, how can he be sure it is not a fake site posing as the entity site? With its registered users, the entity can do a username/Passmark/password exchange as described in the related applications to establish a two-way authentication. But what about users who are not registered with the entity the user wishes to be authenticated?

One current approach is to place a verification seal on the site itself (such as a "Verified by Verisign" seal) by which a registry attests to the authenticity of the site. When that seal is clicked, it redirects the user to the registry, which provides details of the ownership of the site.

This approach is vulnerable to phishing attacks, because an imposter can simply copy the seal from the real site and include it on a fake site. When a user clicks on the seal on the fake site, the imposter can redirect the user to a fake version of the registry site, which can attest to the authenticity of the fake site. Like a "house of mirrors", fake sites can attest to other fake sites, and the user never knows who he is really talking to.

(Expert users may be able to discern a fake attestation by deciphering the URL of the fake registry site, or by clicking on the small "lock" icon in the lower right corner of most browsers and deciphering the URL and attestations in the resulting message. But it is difficult for most users (a) to know they should try to do this and (b) to know how to do this even if they know to try. And if the user is capable of using these techniques to authenticate the registry, he should be able to use URL-deciphering techniques to authenticate the entity itself, and not need to authenticate the registry. Verifying the registry is a second-level problem similar to the first-level problem of verifying the entity—the very problem that the registry is attempting to solve.)

Passmarks can solve this issue of unauthenticated-and-therefore-spoofable verification. In the simple instance with an entity's registered users, the entity can authenticate itself using its own Passmarks (Class A). In the more complicated instance of users not registered with an entity, a registry can use Passmarks to authenticate itself and its verification of the entity's Web site:

When a user clicks on a seal on the entity's site, the user is redirected to the registry's site. The registry then presents both (a) an attestation of the entity's site and (b) the registry's Passmark for that user. Since only the registry and the user know that Passmark, this prevents the registry's attestation from being copied by a fake site.

This does require that the user be registered with the registry. However, as described above, this can be a very quick and simple process, and need happen only once.

Figure 5:
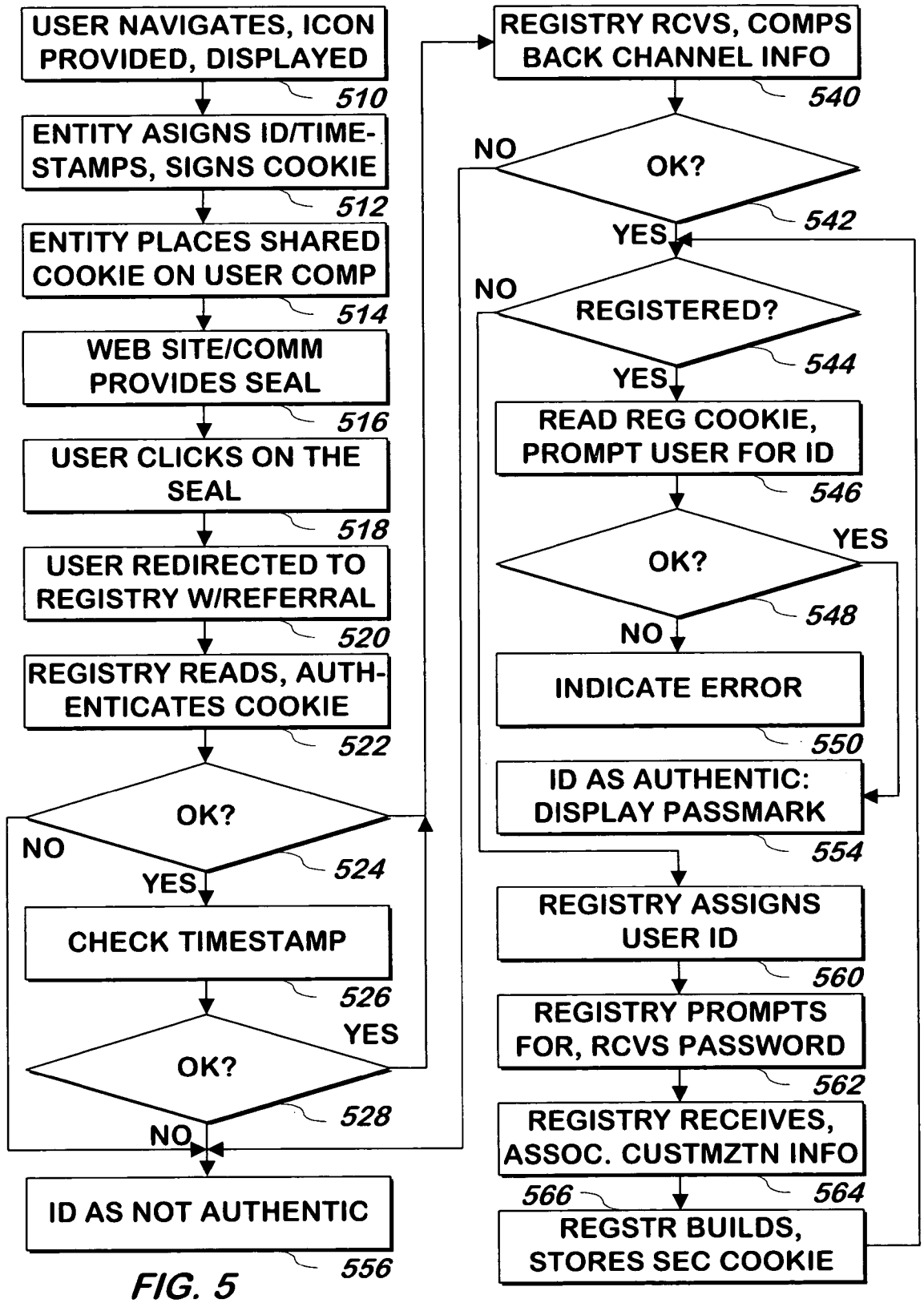
FIG. 5 is a flowchart illustrating a method of authenticating information, such as a web site or communication, according to one embodiment of the present invention.
Figure 6:
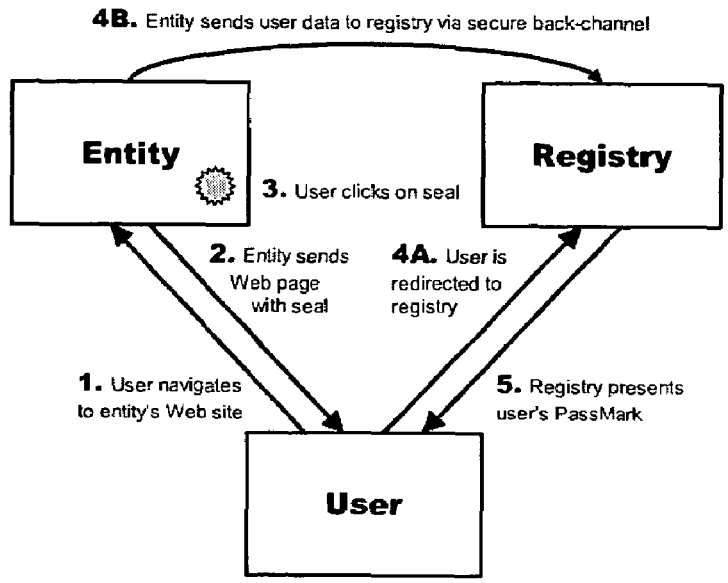
FIG. 6 is a flow diagram illustrating the flow of information in the method of FIG. 5 according to one embodiment of the present invention.

FIG. 6 illustrates an overview of the implementation steps to ensure the security of such an attestation. FIGS. 2, 3, and 4 illustrate a network of computers 210 (and similar user computer systems), 300 (and similar servers), 400 and additional detail for two such computers 300 and 400. FIG. 5 is a flowchart that illustrates the steps taken. Referring now to FIGS. 2-6, steps in one representative method will be described with reference to the system arrangement of FIGS. 2-4, though the specific methods are not linked to any specific system arrangements and vice versa.

The user navigates 510 (either by typing or pasting in a URL, or by following a link) to a Web site which purports to be the entity's Web site served by entity server 300 (e.g. amazon.com). In one embodiment, the user uses user computer system 210 to so navigate to a web site operated by the entity, and such site may or may not be resident on entity server 300, which can operate as a conventional web server as described herein.

Figure 7:
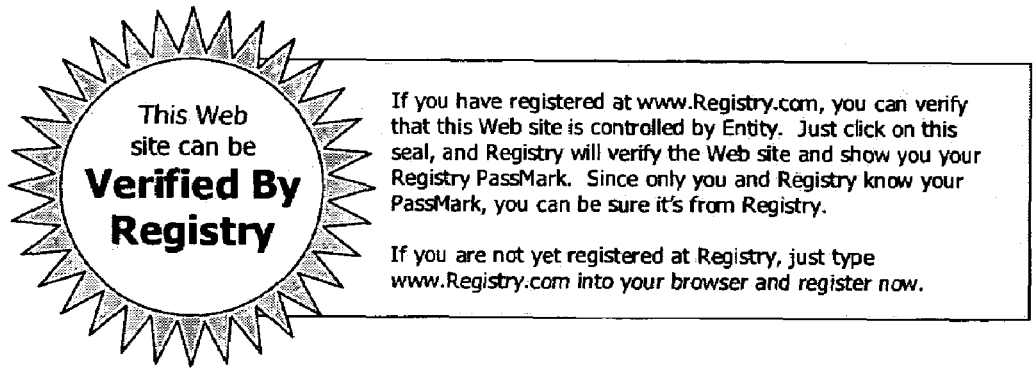
FIG. 7 is an illustration of a seal according to one embodiment of the present invention.

Web page/communication builder 320 of entity server 300 returns to the user a Web page to the user which includes a link to verification seal from the registry, which is displayed on the user's computer system 210 as part of step 512. The seal, or some other element on the page, is served from a "shared domain" of entity server 300, a shared domain being a domain that is different from the entity's regular domain and to which access is shared with the registry (e.g. amazon.registry.com). The seal may be referenced by a web page that is not served from the shared domain (e.g. a web page at amazon.com may link to the seal at amazon.registry.com: e.g. amazon.registry-.com/seal.jpg). The actual server used to serve the seal may be either entity server 300, though registry server 400 may also be used. The seal may be any icon, and need not be an actual seal. One embodiment of a seal is shown in FIG. 7.

To build the link from the seal or icon, web page/communications builder 320 signals referral manager 322, which provides the link stored therein. The link is a link to a web page on registry server 400 and contains referrer information after the domain name and filename of the image containing the seal, e.g. "zzz.registry.com/authenticate?referrer=amazon.com" (where zzz is replaced by "http://www"). If the user clicks an area approximately near the seal, their browser will take them to this address.

Web page/communication builder 320 of entity server 300 also signals cookie manager 330 to build and provide a session-based or short-lived cookie to the user's computer system 210. Cookie manager 330 signals user identifier manager 336, which generates a unique identifier, such as a session number or random string and provides it to cookie manager 330. Cookie manager 330 may also signal timestamp obtainer 332, which obtains the current date and time from the system clock or a time server accessible to both servers 300, 400, and provides the date and time to cookie manager 330. Cookie manager 330 provides the identifier and date and time to signer 334, which hashes either or both of the identifier and date and time and provides to cookie manager 330 a signature, which are shown in FIG. 5 as step 512. Cookie manager 330 builds a cookie containing any or all of the identifier, date and time and signature, and either via web page/communication builder, or directly via communications interface 310, stores the cookie on the user computer system 210 via the shared domain (e.g. amazon.registry.com), all of which are shown as step 514.

Such a shared-domain cookie (or any other type of device ID which restricts access to only those domains included in the shared domain) is thus placed or otherwise established on the user's computer 210. Since the user's browser will only allow the entity server 300 and the registry server 400 to read and write to the shared-domain cookie, it provides a vehicle for secure communication between them using the user's computer. The cookie and the seal are added to the user's computer system under the shared domain by web page/communication builder 320, the seal being provided as part of step 516.

The user can view the seal or other icon via computer system 210 and can optionally use user computer system 210 to click on the verification seal to authenticate the site as part of step 518.

After the user clicks on the verification seal, at least one and possibly two actions occur simultaneously or nearly so:

The user is redirected 520 by the browser in user computer system 210 to the registry server 400 using the top level shared domain (e.g. registry1234) along with "referral" information—data in the redirected URL indicating where the user has been re-directed from. (It is noted that this referral information can be altered by the originating site, making it an unreliable indicator of the true originating site from which the user was redirected. Even if encrypted data is inserted into the header, it can be read by a fake site and re-inserted into the header of a user being redirected from the fake site.)

Because the user's browser will allow a shared-domain cookie to be read by the entity and by the registry but not by any other site, the use of a shared-domain cookie prevents an attacker from using a man-in-the-middle approach to capture a unique identifier from the real entity site and place that identifier in a cookie on the computer of a user viewing the fake entity site, and then redirecting that user to the real registry site with a valid unique identifier.

The registry server 400 will receive the request for the web page specified in the link from the seal and the referrer information and communication interface 410 will provide the referrer information to cookie manager 418 in response to the request for a specified web page. Cookie manager 418 attempts to retrieve the cookie for the subdomain identified by the referrer information, or retrieves all cookies and utilizes the cookie corresponding to the referrer information. Cookie manager 400 provides the information from the cookie and the referrer information to cookie authenticator 420, which attempts to authenticate it by using the referrer information to identify the hash and any key used to hash the identifier and optionally the timestamp in the cookie in the same manner that signer 334 signed the same information, and then repeating the hash for the identifier and optionally the timestamp in the cookie. In one embodiment, each entity server for a subdomain (e.g. amazon.registry.com) will use its own unique hash function and or key to sign the cookie, and a table of the subdomains and hash functions and keys for all valid subdomains may be internally stored by cookie authenticator 420. If the signatures match, cookie authenticator 420 provides to cookie manager 418, an indication that the cookie is authentic, and otherwise, it provides to cookie manager 418 an indication that the cookie is not authentic, all as part of step 522.

If the cookie manager 418 cannot locate the cookie corresponding to the referrer information or receives an indication from cookie authenticator 420 that the cookie is not authentic 524, it will communicate an indication of the problem to message manager 426, which provides a message that indicates that the site is not verified, and may indicate to the user not to trust the information supplied by the site, nor supply any information to the site 556. If the cookie is located and authentic 524, the method continues as will now be described.

Cookie manager 418 may provide the timestamp from the cookie to timestamp manager 422 which obtains the date and time from a system clock or the same time server used by timestamp obtainer 332 or a different time server having approximately the same date and time as the server used by timestamp obtainer 332 and identifies if the differences between the two timestamps exceeds a threshold 526. If, at 528, the threshold is exceeded or the time in the cookie is significantly before the time retrieved by timestamp manager 422, timestamp manager 422 so indicates to cookie manager, which communicates an indication of a problem to message manager 426, which responds as described above 556. If the threshold time difference is not exceeded and the timeshare not inconsistent 528, the method continues as will now be described.

Other means of authenticating the cookie may be used, in addition to the shared cookie, such as by cookie manager 330 signaling back channel manager 340 at the time it builds the cookie as described above. Back channel manager 340 requests and receives a timestamped, optionally signed token from back channel authenticator 424, which is placed in the cookie, for example as part of step 514. Cookie manager 418 provides this information from the cookie to timestamp manager 422 and cookie authenticator 420, which is used by timestamp manager 422 to ensure the timestamp is not past a threshold from the current date and time and by cookie authenticator 420 to compare the signature and ensure the token is on a list of tokens it receives from back channel authenticator 424 at step 540. Such authentication, shown at step 540, may be used in place of, or in addition to any or all of steps 522-528.

In another embodiment, at such time as the cookie is generated, or near such time, back channel manager 340 on the entity server 300 may also receive from cookie manager 330 and independently send the unique identifier and other data it placed in the user's shared-domain cookie to the registry via secure back-channel communication (such as a link encrypted with shared secret keys) it maintains with back channel authenticator 424, which internally stores the information. If so, back channel authenticator 424 receives the cookie information from cookie manager 418 and compares 540 the unique identifier it receives from the secure back-channel to the unique identifier it reads from the redirected user's shared-domain cookie.

If the back channel information from the cookie matches that which was communicated over the back channel 542, this further confirms that the entity's Web site is the true originating site, and back channel authenticator 542 signals cookie manager 518 and the method continues as described herein and otherwise 542 back channel authenticator 424 signals cookie manager 418 that the cookie is not authentic, and cookie manager 418 provides an indication that the cookie is not authentic to message manager 426, which notifies the user that the site is not authentic as described above 556.

Communication between back channel manager 340 and back channel authenticator 424 may be made via a secure communication means, such as an encrypted session over the Internet.

The use of the secure back-channel prevents an attacker from copying the seal onto a fake version of the entity's site, and then redirecting the user (with altered referral information) to the real registry site for verification of the fake site. The information in the shared-domain cookie should also prevent this attack, but the back-channel can be added to increase the general level of security or in situations where the security of the shared-domain device ID cannot be relied upon.

The data payload in either or both of the back-channel communication or the shared-domain cookie or both can be loaded with additional (and optionally encrypted) information to be securely communicated from one site to the other, such as profile, status, payment or other information.

If cookie manager 418 receives indications that the cookie is authentic, cookie manager 418 attempts to locate a cookie for the top level shared domain (e.g. registry.com). The cookie is placed on the user computer system 210 at the time of registration as described in the related applications (and in step 566) to identify the user. Cookie manager 418 provides the information in the cookie and an indication that the cookie is a registration cookie to cookie authenticator 420, which attempts to authenticate the cookie as described in the related applications and provides an indication of its authenticity to cookie manager 418.

If the cookie is located and authenticated as described in the related applications, the user is registered 544, and so cookie manager 418 provides a user identifier from the cookie either to prompter 416 or to message manager 426. If received by prompter 416, prompter 416 prompts the user for a username optional step 546, receives the user identifier, and checks the user identifier against one or more usernames in the cookie, and the user identifiers in customization information storage 414. If the user identifier entered matches that in the cookie and one in customization information storage 414 548, prompter 416 provides the user identifier to message manager 426, and otherwise 548, prompter 416 provides to message manager 426 an indication that the user identifier did not match, and message manager 426 so indicates to the user as described above or indicates that the user identifier is invalid. It isn't necessary to prompt the user for a user identifier as the one from the cookie can be used to compare against those in customization information storage 414, however, it may be possible for more than one user identifier to be located in the cookie if more than one user is registered on that user computer system 210, and so prompting can narrow the user identifiers in the cookie down to a single user.

If it receives the user identifier and the user identifier matches that in the cookie and in customization information storage 414 as described above 548 (or the user identifier in the cookie is also in customization information storage 414), message manager 426 retrieves the user's Passmark and provides to the user computer system 210 a web page with the Passmark as described in the related applications and indicates that the web site is authentic 554. The retrieval of the cookie, prompting for the password and providing the Passmark may be performed using a secure protocol, such as HTTPS.

If there is no registration cookie or the cookie is not authentic, the user is not registered. If the user is not registered 544, cookie manager 418 signals registration manager 412, which assigns to, or receives from, the user a user identifier, optionally prompts the user for a password 560, receives a password 562 and allows the user to select or supply a Passmark (i.e. customization information) as described in the related applications over the same secure connection as was used to attempt to retrieve the cookie 564. Registration manager 412 stores the user identifier, password, and Passmark or indication of the Passmark associated with one another 564 into customization information storage 414 as part of step 564. Registration manager 412 provides 566 a registration cookie on the user computer system 210 via the secure connection as described in the related applications. Registration manager 412 then signals cookie manager 418, which repeats the process starting at step 544. Because the user is registered, the "yes" branch of step 548 will be taken as described above.

Because the registry registers a device ID (such as a secure cookie) every time it registers a user, and it uses those device IDs to prevent man-in-the-middle attacks against the registry. Since the user's browser will only allow a registry-domain cookie to be read by the registry, its use prevents an attacker from entering a user's username at the registry site, receiving the user's registry Passmark, and replaying the Passmark to the user from a fake registry site.

Note that this general method can also be applied to a broad class of problems. A shared-domain cookie (or other shared-domain device ID) can be used in any instance where it is desired to authenticate the transfer of a user from one site to another site with a different domain, and/or to securely transfer data between those sites.

The use of a subdomain and domain as described above is but one possible way to share a cookie. In one embodiment, the registry server 400 operates as a subdomain from the domain operated by the entity server 300. Thus, the entity server can operate amazon.com, and the registry can operate amazon.registry.com. Any way of sharing a cookie may be used by the present invention. The registry server can redirect the user to a site operated by the registry server (e.g. registry.com) just prior to reading the registration cookie of steps 546 and 566.

The cookie itself is just a token that is passed from entity server 300 to registry server 400, however other tokens may be used. Tokens may be passed in the link to the registry server 400 in the referrer information, for example or through other conventional means.

Class C Variant: Payment on a Merchant Site

A variation on the Class C techniques can be used to protect a password-protected payment transaction originating from a merchant's site. In such a scenario (such as Verified by Visa or PayPal), the user is typically redirected from the merchant site to the payment site for the entry of the password or other authenticating information. Fraudulent scenarios that can be protected against include:

A fake merchant site, which looks like the real merchant site,

A man-in-the-middle attack against the merchant site,

A fake payment site, which looks like the real payment site, and

A man-in-the-middle attack against the payment site.

All of these attacks can be prevented if the user looks for his Passmark at the payment site before he enters sensitive information such as his payment password. The steps are similar to those in the basic Class C scenario:

The merchant site places a shared-domain cookie on the user's computer, then re-directs the user to the payment site. The merchant can also include other information, such as the dollar amount of the transaction and any verifying personal information, and/or can send this information via secure back-channel as well. The payment site reads the shared-domain cookie data and the payment site cookie data, verifies all the data, and presents the user's payment site Passmark to the user. At that point the user knows that it is safe to enter his payment password.

Following this process, the payment site can simultaneously protect against all of the fraudulent scenarios listed above:

The user was not redirected from a fake merchant site, because a fake merchant site would not have been able to place a shared-domain cookie on the user's computer (nor sign the data or initiate a back-channel communication).

The merchant site was not subject to a man-in-the-middle attack, because the man-in-the-middle would not have been able to capture a shared-domain cookie and re-play it onto the user's computer (nor intercept a back-channel communication).

The user was not redirected to a fake payment site, because a payment fake site would not be able to display the user's payment Passmark.

The payment site was not subject to a man-in-the-middle attack, because the man-in-the-middle would not have been able to capture and replay the user's payment site cookie in order to receive and replay the user's payment site Passmark.

Class D: Outbound Communication with Non-Registered Users

A registry can be used by an entity to authenticate outbound communications to its non-registered customers, in the following manner:

The entity includes a verification seal in its outbound email along with an electronic signature of the contents of the email. The seal contains the URL of the registry where the user may go to register, if he is not already registered. Once registered, the user simply replies to the email. The reply goes to the registry, which verifies that the contents match its electronic signature and, if so, sends the email back to the user with the user's Passmark appended to it.

Figure 8:
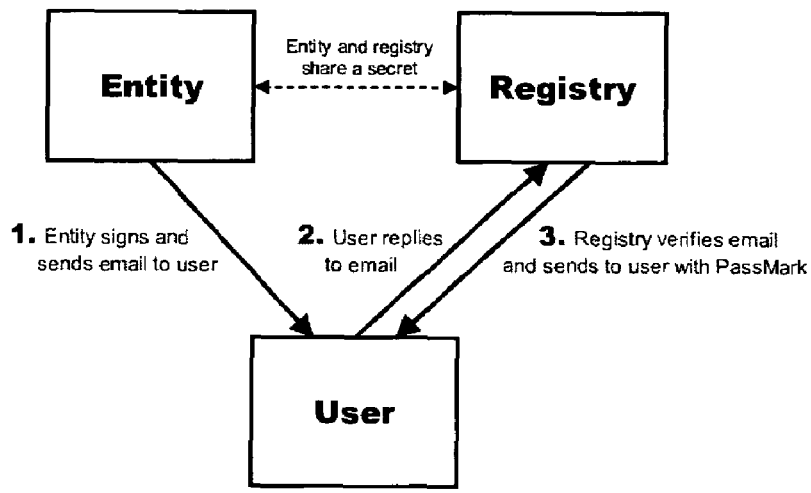
FIG. 8 is a flow diagram illustrating a flow of information in an embodiment of the present invention used to allow a user to authenticate an e-mail message.

FIG. 8 illustrates the implementation steps to insure the security of such an authentication of an outbound email:

The entity establishes a relationship with the registry, and the entity is assigned one or more secrets (typically an encryption key or digital certificate) to be used to sign outgoing emails.

Figure 9:
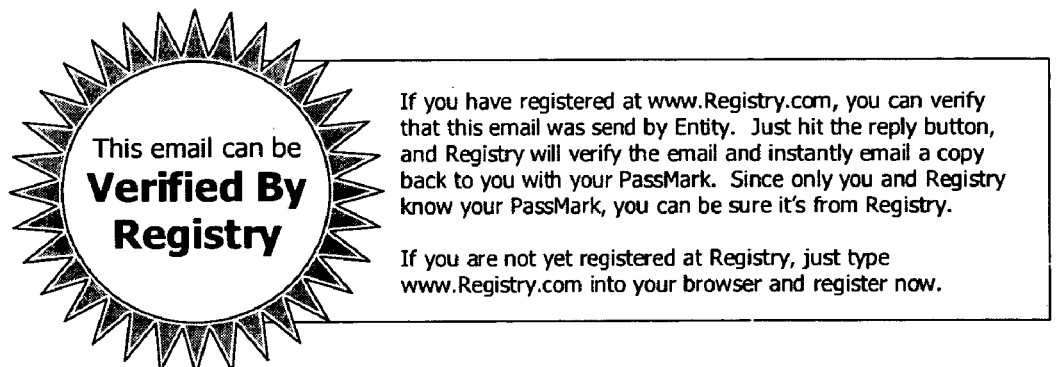
FIG. 9 is an illustration of an e-mail seal according to one embodiment of the present invention.

When the entity prepares an email to a user not registered with that entity, it includes a verification seal (typically a graphic image describing how the email can by authenticated by the registry and listing the URL for registering with the registry, such as the one shown in FIG. 9), and then electronically signs the entire contents of the email, including the user's email address.

When the user receives the email, he first registers with the registry if he has not already done so. Once registered, he can simply reply to the email, which will send the email to the registry (either directly if the registry is specified on the reply address, or forwarded by the entity).

The registry verifies (1) that the contents of the email and the user's email address match the electronic signature, to insure that the email has not been altered, and (2) that the secret used to sign the email matches the secret assigned to the entity, to insure that the email was sent by the entity.

Upon such verification, the registry instantly sends a copy of the email back to the user at the original email address, with that user's registry Passmark appended to the email as confirmation that it is the actual registry (an not someone posing as the registry) who is attesting to the authenticity of the entity.

Once registered, the user can simply hit the reply button to receive an instant authentication of any email sent by the entity.

Class D Variants: Other Techniques to Verify Emails

There are a number of other ways in which Passmarks can be used to verify emails:

Passmarks in Outbound Email. If the registry has a substantial number of registered users, an entity may match its list of outgoing email addresses against the registry's list, and retrieve the registry Passmarks for those users. Then, the entity may insert each matched user's registry Passmark in the outgoing email as an instant verification (not requiring the user to reply to the email).

Email Content at the Server. A URL can be included in the email directing the user to a site which, after authenticating the user (using either (a) unique and optionally encrypted information appended to the URL sent in the email, (b) a secure cookie or other device ID on the user's computer, and/or (c) information such as username or email address entered by the user on the site), can display the user's Passmark along with the entire contents of the email.

Additional Topics: Registration Techniques

Registration at the registry can be accomplished in multiple ways. The simplest is for the user to type in the URL of the registry and register on the registry's Web site. (The user should type in the address of the registry rather than clicking on a link, in order to avoid phishing attacks on the original registration.) For the user, the registration process can be as simple as entering the user's email address and viewing the Passmark that is then randomly assigned to that user. (Optionally, more user information can be collected and/or the user can select his own Passmark or upload an image from his computer.)

Typically, a device ID such as a secure cookie will be placed on the computer during registration, to facilitate secure two-way authentication if the user subsequently visits the registry. Optionally, to ensure that such registrations are made only by the owner of the email address, an email confirming the registration can be sent to the email address with an activation code or process (which can be as simple as replying to the confirming email).

Alternatively, registration can be automatically performed when a user replies to his first email which is verified by the registry. In this scenario, the registry would randomly assign a Passmark and email it back to the user with the email contents. The user would then reply once again to the email to confirm his control of the email address and to activate his registration with the registry. However, a possible weakness of this particular scenario is that it could be spoofed by a phisher who send out emails with a reply address that he controlled.

Additional Topic: Multiple Device IDs

One problem with cookies and other device IDs is that they can be erased, lost or destroyed. Occasionally, for instance, users delete some or all of their cookies, sites overwrite their own cookies, or users lose or misplace their hardware tokens. The user then typically re-registers in order to restore these missing device IDs.

An improved technique is to utilize multiple device IDs simultaneously, so that if one device ID is missing another device ID can be used to (a) identify the computer and (b) re-establish the first device ID back onto the computer.

Examples of device IDs that can be used in this way include:

Browser Cookie. A cookie is data (which can include identifying data) placed onto a user's computer by a Web site, which is subsequently accessible by the web sites the user visits. Access to the cookie can be limited to web sites at the originating domains, and data in the cookie can be encrypted. The browser on the user's computer controls access to the cookie.

Flash Shared Object. Similarly, a shared object is data placed on a user's computer by a site using Macromedia Flash content on its Web page. Access to the shared object can be limited to web sites at the originating domains, and data in the shared object can be encrypted. The Flash player on the user's computer controls access to the shared object.

Other Local Data. Similarly, data may be placed on a user's computer in a different format, with different software installed on the user's computer controlling access to that local data. The local software could be (a) included in the basic infrastructure of the computer such as its BIOS or operating system (e.g. Phoenix or Microsoft), (b) included in third-party software such as anti-virus or utility programs (e.g. McAfee or Adobe), or (c) installed directly by an entity desiring to use this data for authentication purposes, or by a registry desiring to use it and allow other entities to use it (see "Additional Topic: Software on the User's Computer" below).

When registering a user, an entity can place and register more than one device ID—for example, a secure cookie and a shared object—on the user's computer. If the user subsequently deletes all of his cookies, the next time the user visits the entity's site, the entity will be able to access the shared object but not the secure cookie. The entity can use the shared object to authenticate the computer, and simultaneously place and register a new secure cookie on the computer so that there are once again two registered device IDs.

Note that this general method can also be applied to a broad class of situations in which the user's cookie or other device ID would otherwise be lost.

Additional Topic: Software on the User's Computer

When registering with a registry a cookie or other device ID is placed on the user's computer. In addition, software code (a program, component or plug-in) may also be installed on the user's computer that will work in conjunction with the entity, the registry or multiple sites to convey the assurances discussed herein with increased functionality and security. This software may also have been previously installed as part of the operating system, original OEM software suite, or other subsequently-installed software program.

The software could perform various functions on behalf of the registry, including:

Authenticating the User's Computer. With this software installed, the options for storing the device ID information on a desktop extend beyond cookies and shared objects. This software could store the device ID in a separate file on the desktop or in a data repository that can be accessed through other components resident at the user's computer. The software may also perform additional validation of the user's computer, such as interrogating various components and peripherals to obtain unique information such as the MAC address of the network interface, the serial number of the disk drive or disk volume serial number or type and identifier of the CPU.

Perform Operations for Valid Sites. The software could include a list of sites (domains and/or hosts within a domain) who are allowed to invoke this software to perform permitted action. For example, the software could be configured to perform certain commands only if the requests come from pre-authorized sites (or sites subsequently authorized by the pre-authorized sites). The software could inspect the header of the requesting transaction to validate the request, and/or establish a secure side-channel communication with the site to verify the authenticity of the request.

Dynamic Local Validation of Web Pages and Emails. The software could be configured to scan Web Pages and Emails for a specific tag (text, string, or other identifier) which would inform the software that the content (such as a Web page or email) being examined is able to be validated by the registry as authentic. The software would then verify the content as being valid by verifying the signature of the content and/or computing a hash of the content to compare with a signed value delivered with the content. Once the software has determined the content to be valid, it would then display the user's Passmark to convey authenticity. The Passmark could be included in-line with the content in a predefined area of the content, or may be presented outside the content in a separate context that may be incorporated into the tool being used, such as the mail client, the browser or toolbar.

Additional Topic: Protecting Images on a Web Site

Figure 10:
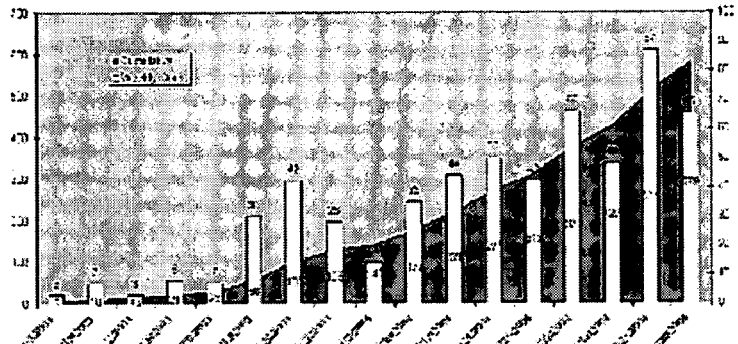
FIG. 10 is a graph illustrating the growth of phishing, a technique whereby a fraudulent party attempts to mislead a user into thinking that information is being generated by a source that is different from the fraudulent party in order to induce the user into providing information that can be used to defraud the user or another party.

In phishing scams it has been seen that a site's own images and content are sometimes used in the scam. This can easily be done by instructing any html page to pull an image from another site by inserting a reference to that site's image in the page. For example, FIG. 10 illustrates an image from the Anti-Phishing Working Group home page that shows a graph of the growth of phishing.

This image from their web site can be included in the page of another web site simply by referencing the image URL (which includes the filename of the image). The URL for this image is:

http://www.antiphishing.org/
APWG%20Phishing%20Attacks%20Weekly%20Feb04.
sm.jpg

The method below describes a mechanism that can be used to serve images from a web site such that they cannot be included on a web page unless certain conditions are met. These conditions would guard against misuse of the image. This is particularly useful in serving Passmark images.

Images are typically requested by a browser as a request to a Web server for an image file by its filename. An alternative method is as follows: a dynamic request to logic code at the server can be used so that the code at the server can then make a decision as to the authenticity of the request and provide the image after specific criteria is met.

Specific criteria used by this method can include:

The device ID of the device requesting the Passmark is allowed to see this Passmark.

The client software has established an acceptable connection with the server which may include any or all of the following:

A valid SSL session,

The user has entered a valid username for this Device ID, and

Timeout restrictions are still valid for access.

The requesting HTML code includes a unique identifier valid for access under the above conditions.

In this way, assurance can be made that only a valid computer under proper conditions can access the Passmark image stored at the server and that the image cannot be accessed by attackers posing as the user.

An example of HTML source code that requests the image in the manner above is the following:

<img
src="getMyPassmark.jsp?it=4bf2eb4e88b9b8700b2ceb
0577ee584f 8" width="100" height="75">

The program getMyPassmark.jsp would contain the logic to ensure verification of conditions employed to display the Passmark as mentioned above. The string following the ?it=is the unique identifier valid for this session only and only when the specific conditions are met by getMyPassmark.jsp logic.

Additional Topic: Alternative Passmark Uses with Registered Customers

An alternative approach to the implementation of Passmarks in emails to its registered customers may be as follows.

A site may choose to focus on the e-mail features of Passmarks primarily, or seek to convey an assurance only after the user has signed in completely to their Web site.

In these scenarios, the Passmark is not shown during the sign-in process, but is only shown after the user has completed sign-in process. In this case, the device ID may or may not be used and the Passmark may be shown simply based upon a completed valid sign-in of the user's credentials being used by the site. In this way, a site can establish a recognizable Passmark with their customers and use this Passmark in other channels of communications such as email, paper mail, instant messenger or other means of communicating with the user. The site may also elect to turn on Passmark at the sign-on screen after having established the recognizable Passmark with the user in this manner.

What is claimed is:

1. A method of authenticating that a communication originated from an entity, comprising:
   providing a token from the entity to a user;
   receiving the token from the user by a registry, the registry comprising a processor and a memory coupled to the processor;
   attempting to authenticate by the registry at least a portion of the token as originating from the entity; and
   responsive to the token being authenticated, displaying information associated with the user by the registry;
   wherein the associated information displayed to the user differs from information associated with at least one other user and displayed to the at least one other user, the associated information displayed to the user comprises customization information selected by or supplied by the user, and the associated information displayed to the user comprises a shared secret between the user and the registry; and
   wherein the token comprises a shared cookie between the entity and the registry.

2. The method of claim 1 wherein the cookie comprises a shared-domain cookie.

3. The method of claim 1 wherein:
   the token additionally comprises information in a link;
   the receiving step is responsive to a user pressing the link; and
   the attempting step is responsive to the information in the link.

4. The method of claim 1 further comprising a step of providing a token from the entity to the registry via a secure back-channel.

5. The method of claim 1 wherein the token comprises a device ID.

6. An apparatus for use by a registry in authenticating that a communication originated horn an entity, the apparatus comprising:
   a processor; and
   a memory coupled to the processor;
   wherein the processor is operative:
       to receive the token from a user, the token having been provided to the user by the entity;
       to attempt to authenticate at least a portion of the token as originating from the entity; and
       responsive to the token being authenticated, to display to the user information associated with the user by the registry;
   wherein the associated information displayed to the user differs from information associated with at least one other user and displayed to the at least one other user, the associated information displayed to the user comprises customization information selected by or supplied by the user, and the associated information displayed to the user comprises a shared secret between the user and the registry; and
   wherein the token comprises a shared cookie between the entity and the registry.

7. The apparatus of claim 6 wherein the cookie comprises a shared-domain cookie.

8. The apparatus of claim 6 wherein:
   the token additionally comprises information in a link; and
   the apparatus receives the token from the user responsive to a user pressing the link and attempts to authenticate at least a portion of the token responsive to the information in the link.

9. The apparatus of claim 6 wherein the apparatus receives the token from the entity via a secure back-channel.

10. The apparatus of claim 6 wherein the token comprises a device ID.

11. An article of manufacture comprising a machine-readable storage medium encoded with executable instructions for use by a registry in authenticating that a communication originated from an entity, the instructions, when executed by a processor associated with the registry, implementing die steps of:
    receiving a token from a user, the token having been provided to the user by the entity;
    attempting to authenticate at least a portion of the token as originating from the entity; and
    responsive to the token being authenticated, displaying to the user information associated with the user by the registry;
    wherein the associated information displayed to the user differs from information associated with at least one other user and displayed to the at least one other user, the associated information displayed to the user comprises customization information selected by or supplied by the user, and the associated information displayed to the user comprises a shared secret between the user and the registry; and
    wherein the token comprises a shared cookie between the entity and the registry.

12. The article of claim 11 wherein the cookie comprises a shared-domain cookie.

13. The article of claim 11 wherein:
    the token additionally comprises information in a link; and
    the registry receives the token from the user responsive to a user pressing the link and attempts to authenticate at least a portion of the token responsive to the information in the link.

14. The article of claim 11 wherein the registry receives the token from the entity via a secure back-channel.

15. The article of claim 11 wherein the token comprises a device ID.

16. A system for authenticating that a communication originated from an entity server, comprising:
    an entity server, comprising a processor and a memory coupled to the processor, wherein the processor is operative to provide a token to a user system, the user system being operative to transmit the token to the registry server; and
    a registry server, comprising a processor and a memory coupled to the processor, wherein the processor is operative:
        to attempt to authenticate at least a portion of the token as originating from the entity server; and
        responsive to the token being authenticated, to transmit to the user system information associated with the user system by the registry server;

wherein the user system displays at least a portion of the associated information;

wherein the associated information displayed by the user system differs from information associated with at least one other user system and displayed by the at least one other user system, the associated information displayed by the user system comprises customization information selected by or supplied by the user system, and the associated information displayed by the user system comprises a shared secret between the user system and the registry server; and wherein the token comprises a shred cookie between the entity server and the registry server.

17. The system of claim 16 wherein the cookie comprises a shared-domain cookie.

18. The system of claim 16 wherein:
the token additionally comprises information in a link; and
the registry sewer receives the token from the user system responsive to a user pressing the link and attempts to authenticate at least a portion of the token responsive to the information in the link.

19. The system of claim 16 wherein the registry server receives the token from the entity server via a secure back-channel.

20. The system of claim 16 wherein the token comprises a device ID.

* * * * *